US006761823B2

(12) United States Patent
Maddux et al.

(10) Patent No.: US 6,761,823 B2
(45) Date of Patent: Jul. 13, 2004

(54) SYSTEM AND METHOD FOR REMOVING CONTAMINANTS FROM WATER

(75) Inventors: John Maddux, Sheridan, WY (US); Jay Stender, Sheridan, WY (US); Shawn Hansen, Sheridan, WY (US); Ron Destefano, Sheridan, WY (US); S. Thomas Throne, Sheridan, WY (US)

(73) Assignee: W. B. Solutions, Inc., Sheridan, WY (US)

( * ) Notice: Subject to any disclaimer, the term of this patent is extended or adjusted under 35 U.S.C. 154(b) by 56 days.

(21) Appl. No.: 09/861,922

(22) Filed: May 21, 2001

(65) Prior Publication Data

US 2002/0170858 A1 Nov. 21, 2002

(51) Int. Cl.[7] .................................................. C02F 3/00
(52) U.S. Cl. ........................ 210/615; 210/616; 210/617; 210/620; 210/629; 210/631
(58) Field of Search ................................ 210/615–617, 210/620, 629, 631

(56) References Cited

U.S. PATENT DOCUMENTS

| | | |
|---|---|---|
| 3,738,932 A | 6/1973 | Kostenbader |
| 3,762,550 A | 10/1973 | Jarr et al. |
| 4,049,545 A | 9/1977 | Horvath |
| 4,430,228 A | 2/1984 | Paterson |
| 4,680,126 A | 7/1987 | Frankard et al. |
| 5,180,491 A | 1/1993 | Polasky |
| 5,425,858 A | 6/1995 | Farmer |
| 5,464,598 A | 11/1995 | Klatte |
| 5,637,220 A * | 6/1997 | Buisman ..................... 210/605 |
| 5,705,078 A | 1/1998 | Kurek et al. |
| 5,914,441 A | 6/1999 | Hunter et al. |
| 5,928,514 A | 7/1999 | Gothreaux |
| 5,954,969 A | 9/1999 | Hedin |
| 6,043,022 A | 3/2000 | Lueking et al. |
| 6,207,047 B1 | 3/2001 | Gothreaux |
| 6,214,088 B1 * | 4/2001 | Karamanev et al. .......... 75/711 |
| 6,284,530 B1 * | 9/2001 | Sharp et al. ............. 435/294.1 |
| 6,544,421 B2 * | 4/2003 | Haridas ...................... 210/617 |
| 2002/0185437 A1 * | 12/2002 | Haridas et al. ............. 210/617 |

OTHER PUBLICATIONS

EPA, "The History of Drinking Water Treatment," EPA–816–F–00–006, Feb. 2000.
Lee's Aquarium & Pet Products product brochure, 1999.
Petsolutions.com website, Biological Media, 2000.
Franson, Mary Ann H., "Iron and Sulfur Bacteria," *Standard Methods for the Examination of Water and Wastewater*, 20th Ed., 1998, pp. 9–78–9–87.
Boon, M. et al., "The ferrous iron oxidation kinetics of *Thiobacillus ferrooxidans* in continuous cultures," Applied Microbiology and Biotechnology, Abstract vol. 51, Issue 6 (1999), p. 820.

(List continued on next page.)

*Primary Examiner*—Chester T. Barry
(74) *Attorney, Agent, or Firm*—Christopher J. Rourk; Akin Gump Strauss Hauer & Feld, LLP

(57) ABSTRACT

A system and method for removing contaminants from water that has a relatively low oxygen content with naturally occurring chemoautotrophic bacteria, ferrous iron, manganese, sulfide, and other contaminants. The system comprises an oxygenation vessel for oxygenating the water and a filtration vessel having bio-filtration media with surfaces that are exposed to the oxygenated water. The chemoautotrophic bacteria propagate in the presence of the oxygenated water and deposit certain of the contaminants on the bio-filtration media as by-products. The contaminants are also precipitated in the presence of the oxygenated water and settle on the bio-filtration media in at least the filtration vessel. A secondary filtration stage can further remove contaminants from the water that were not sufficiently removed by the first filtration stage.

40 Claims, 6 Drawing Sheets

OTHER PUBLICATIONS

Nyavor, K. et al., "The effect of ferric iron on the rate of ferrous oxidation by *Thiobacillus ferrooxidans*," Applied Microbiology and Biotechnology, Abstract vol. 45, Issue 5 (1996), p. 688.

Colorado School of Mines, AMD Chemistry: "Environmental Chemistry in Colorado Toxic Mine Drainage Chemistry and Treatment," www.mines.edu.

Colorado School of Mines, Microbial Influences: "*Theobacillus ferrooxidans*," www.mines.edu.

Rawlings, D. E. et al., "Reasons why '*Leptospirillum*'–like species rather than *Thiobacillus ferrooxidans* are the dominant iron–oxidizing bacteria in many commercial processes for the biooxidation of pyrite and related ores," Microbiology (1999), 145, 5–13.

* cited by examiner

SYSTEM AND METHOD FOR REMOVING CONTAMINANTS FROM WATER

BACKGROUND OF THE INVENTION

The present invention is directed to filtration systems and, more particularly, to a system and method for removing contaminants from groundwater associated with underground natural gas wells, mining operations, and other environments.

It is often necessary to remove water from underground geological formations in order to release natural gas associated with the underground formations. Oftentimes, the formations are more than 1,000 feet below the surface of the earth. A typical formation can comprise several separate layers of the liquid and gas or can comprise a single large reservoir. A bore hole is drilled into the earth and passes through the different layers of the formation until the target layer is reached. The location and depth of the bore hole is carefully controlled because of the great expense associated with drilling the bore hole. In order to prevent collapse of the bore hole after drilling, it is usually lined with a casing along its entire length. The casing also helps to control reservoir pressure and protect surface water from contamination. The casing is cemented in place and sealed at the ground surface by a wellhead.

One or more pipes or tubes extend into the bore hole from the wellhead. One of the tubes is typically used to carry liquid to the surface. The internal pressure of many geological formations is often insufficient to naturally raise commercial quantities of the natural gas from the formation through the bore hole or does so at an inadequate flow rate. Oftentimes, a large volume of liquid is present in the underground formation and must be removed on a continuous basis in order to recover natural gas from the formation. An artificial lift system is used in conjunction with the tube(s) to remove the liquid from the underground formation. Currently, many different types of artificial lift systems are available to lift the liquid from the formation, the most common of which are progressive cavity pumps, beam pumps and subsurface gas lift (SSGL) systems.

No matter what artificial lift system is used, water retrieved from underground coal formations often contains contaminants such as iron and inorganic and organic sulfur compounds, manganese, sodium, barium, arsenic, and other trace metals, and coal fines. Some constituents indigenous to groundwater associated with underground coal seams, such as iron and manganese, are pH dependent, while other constituents, such as sulfur, are more oxygen dependent. These constituents typically exist in soluble forms in the groundwater. When the groundwater is ejected or pumped to the surface and exposed to air, iron, sulfur and manganese are oxidized, resulting in the deposition of insoluble forms and precipitate on contact surfaces causing discoloration. The precipitates may also impart foul taste and odor to the water.

Federal and state regulations dictate minimum water quality standards that must be met before water from underground formations, mines or other underground structures can be discharged into the environment. When such standards are not met, the environment may be adversely affected and gas production or other operations may be halted. Due to the excessive amounts of contaminants in the discharge water, many natural gas producers are experiencing difficulties in obtaining discharge permits from state agencies.

Prior attempts to filter the contaminated water have included activated carbon filters, capacitive deionization systems, and the like. The filters can become quickly clogged and therefore must be constantly monitored, cleaned and/or replaced, leading to great expense and reduced efficacy over time. This problem is exacerbated by the relatively large flow rates that must be accommodated. By way of example, a filtration system may be required to process approximately 100 gallons of groundwater per minute over a 24-hour period of time, depending on the number of wells associated with the filtration system, the volume of groundwater to be lifted from each well, and the frequency at which the groundwater is lifted. Thus, approximately 144,000 gallons or 3,429 barrels of groundwater may pass through the filtration system every 24 hours.

In addition, natural gas wells are typically located at remote locations where power from electrical grids may not be available. In such locations, the wells may be operated through wind, solar or gas powered generators. Accordingly, filtration systems at remote locations should require little or no electrical power to operate.

It would therefore be desirable to provide a filtration system that is capable of removing large amounts of contaminants from groundwater under large flow rates in a relatively quick and efficient manner without substantial degradation of the filtration system. It would also be desirable to provide a filtration system that requires little or no electrical power to operate.

SUMMARY OF THE INVENTION

According to the invention, a method is provided for removing contaminants from water that has a relatively low oxygen content with naturally occurring chemoautotrophic bacteria, and at least one of iron in the ferrous state and sulfide. The method comprises oxygenating the water and directing the oxygenated water to a filtration vessel. The filtration vessel has bio-filtration media with surfaces that are exposed to the oxygenated water. The chemoautotrophic bacteria propagate in the presence of the oxygenated water and at least one of the ferrous iron and sulfide. At least one of ferric iron and sulfate are deposited on the bio-filtration media as a by-product of the chemoautotrophic bacteria. At least one form of ferric iron and iron sulfate are precipitated in the presence of the oxygenated water. The water can then be removed from the filtration vessel and either discharged into the environment or directed to a secondary filtration stage.

Further according to the invention, a system is provided for removing contaminants from water that has a relatively low oxygen content with naturally occurring chemoautotrophic bacteria, and at least one of ferrous iron and sulfide. The system comprises an oxygenation vessel for oxygenating the water and a filtration vessel having first bio-filtration media with surfaces that are exposed to the oxygenated water. With this arrangement, at least one form of ferric iron and iron sulfate can be precipitated in the presence of the oxygenated water and can be deposited on the bio-filtration media as a by-product of the chemoautotrophic bacteria to thereby remove ferric iron and/or iron sulfate from the water.

BRIEF DESCRIPTION OF THE SEVERAL VIEWS OF THE DRAWINGS

The preferred embodiments of the present invention will hereinafter be described in conjunction with the appended drawings, wherein like designations throughout the drawings denote like elements, and wherein.

DETAILED DESCRIPTION OF THE INVENTION

Figure 1:
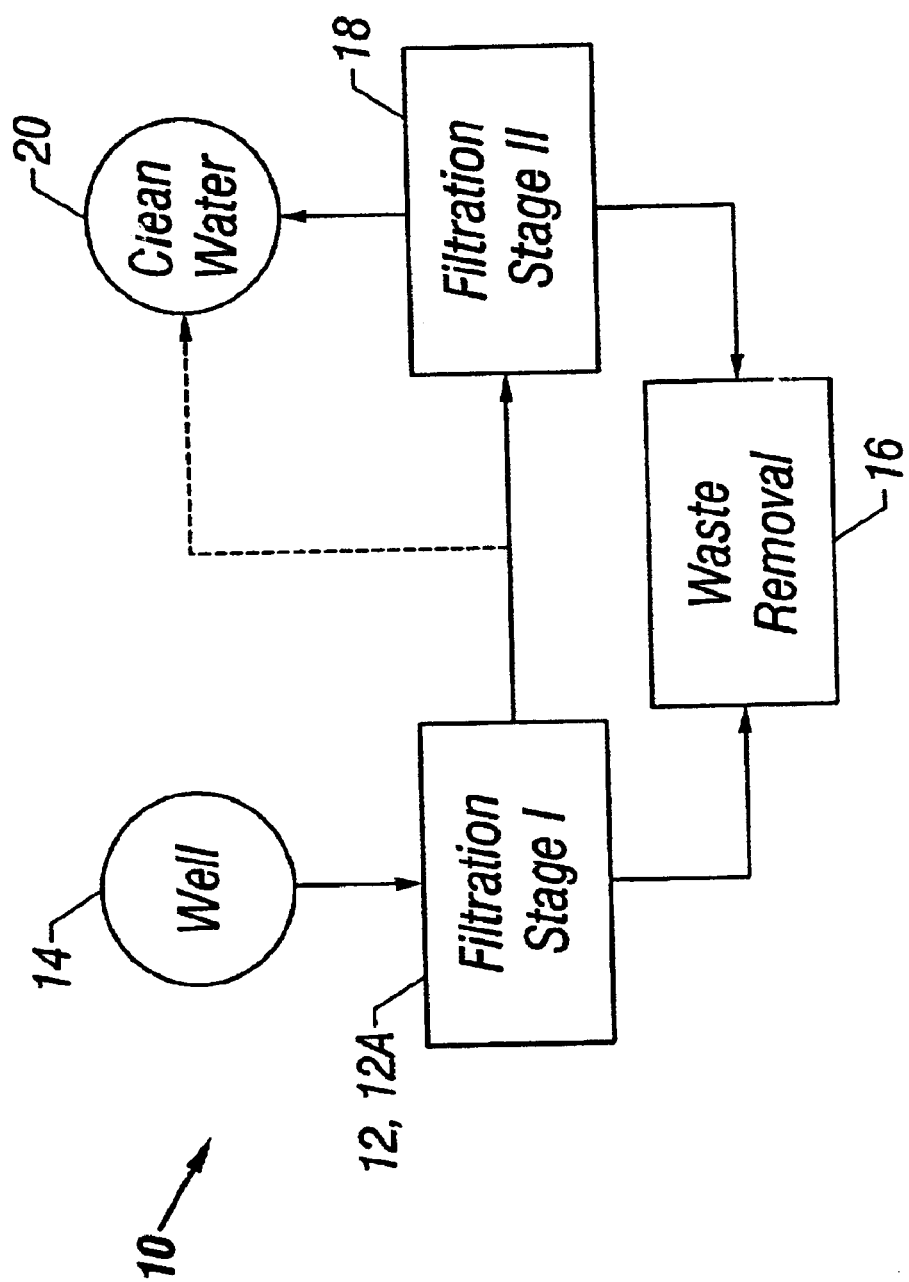
FIG. 1 is a schematic block diagram of a system for removing contaminants from water according to the present invention.

Referring now to the drawings, and to FIG. 1 in particular, a system 10 for removing contaminants from groundwater according to the present invention is illustrated. The system 10 includes a first filtration stage 12, 12A that is connected between a well 14 and a waste removal stage 16. The well 14 may be associated with an underground gas producing formation, such as an underground coalbed formation where groundwater is removed through an artificial lift system to recover methane gas. A second filtration stage 18 is preferably connected to the first filtration stage 12, 12A for removing particles that pass through the first filtration stage. The second filtration stage 18 is also connected to the waste removal stage 16. As shown, clean water 20 exits from the second filtration stage for safe disposal in the environment or other uses. Alternatively, depending on the type and amount of contaminants to be removed from the groundwater, the second filtration stage may be eliminated, so that the water is directly discharged to the environment after the first filtration stage.

As will be described in greater detail below, and according to a preferred embodiment of the invention, the first filtration stage 12, 12A is constructed to extract relatively large amounts of iron, sulfur, manganese, coal fines and other relatively large particles that would otherwise plug up the second filtration stage 18. Without the first filtration stage 12, 12A, the second filtration stage would require constant maintenance or would be rendered partially or wholly inoperative, and therefore would not be an economically feasible approach in and of itself.

The second filtration stage can be constructed to remove sodium, barium, arsenic, and other contaminants that may not be sufficiently removed by the first filtration stage. Many different types and configurations of filters and filter systems well known to those of ordinary skill in the art can be used for the second stage, such as reverse osmosis, ion exchange, and activated charcoal filters. According to a preferred embodiment of the invention, a Capacitive Deionization Technology (CDT) filter system is used for the second filtration stage 18. In the CDT system, sheets of thin carbon aerogel material are formed into cells and placed at opposite boundaries of a flow path of the incoming water. By polarizing the cells, oppositely charged ions migrate to the oppositely charged sheets of aerogel material. A second filtration stage constructed in this manner can be controlled electronically through software, requires little power consumption to operate, and is easier to maintain than other filter systems. More details of the CDT system can be found in U.S. Pat. No. 5,425,858 issued to Joseph Farmer on Jun. 20, 1995, the disclosure of which is hereby incorporated by reference.

Figure 2:
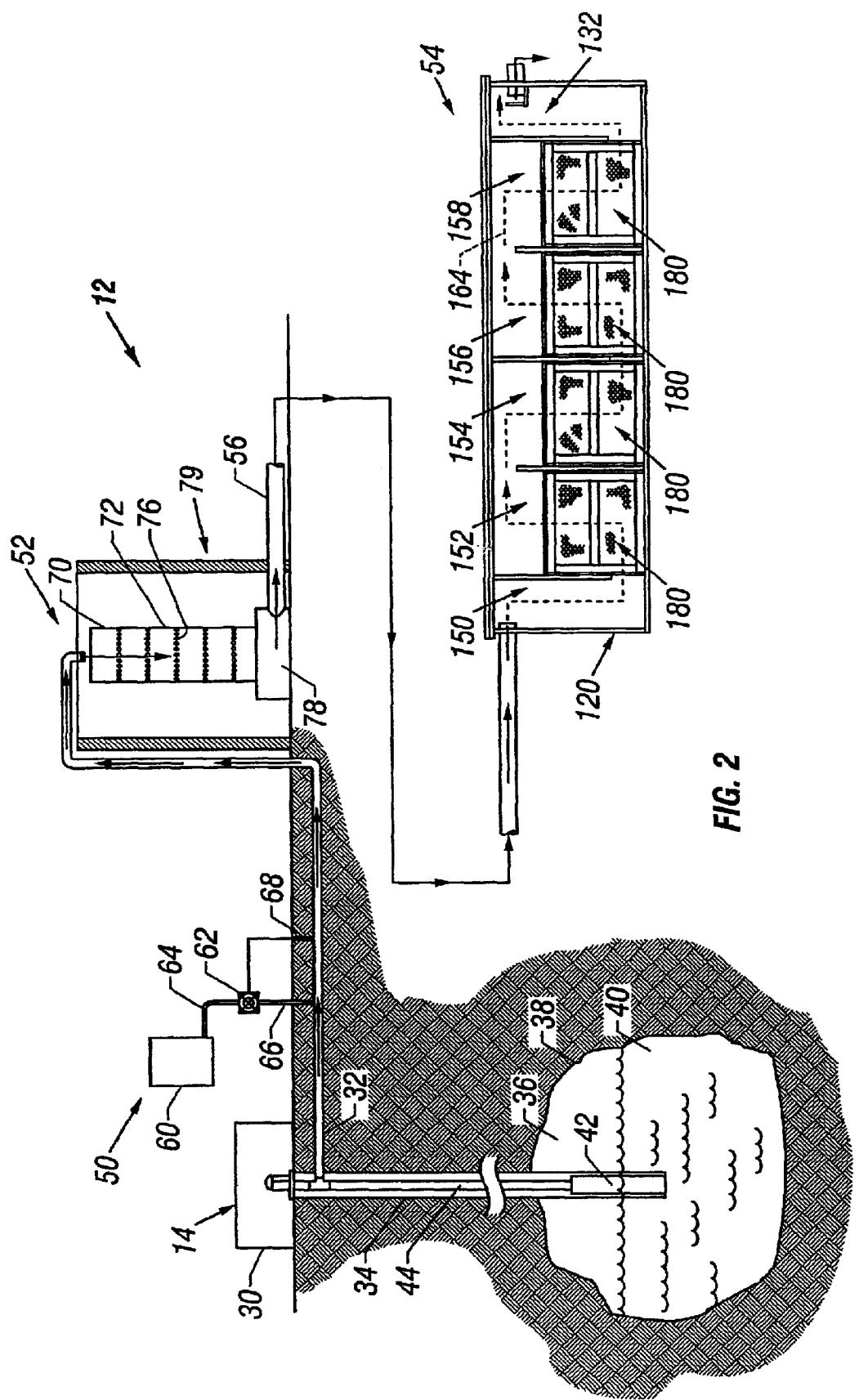
FIG. 2 is a schematic diagram of a system for removing contaminants from water according to the present invention and showing the system connected to a well head associated with an underground formation.

As shown in FIG. 2, the first filtration stage 12 is connected to the well 14, such as a coalbed methane well, through an underground pipe 32. The well 14 includes a well head 30 and a casing 34 that extends into a reservoir 36 of an underground formation 38 from the well head. The reservoir 36 may include groundwater 40 that must be removed before gas can be produced from the formation 38. An artificial lift system 42, such as a down-hole pump or the like, is connected to a production tube 44, which is in turn connected to the underground pipe 32. The artificial lift system 42 moves water from the underground reservoir 36, through the tube 44, and into the pipe 32.

The first filtration stage 12 includes a chemical treatment system 50 that is connected to the underground pipe 32, an aeration tower 52 located at a discharge end of the pipe 32, and a filtration tank 54 connected to the aeration tower through a pipe 56.

The chemical treatment system 50 includes a storage tank 60 containing oxidation media. A metering pump 62 is connected to the storage tank 60 through tubing 64. An injection nozzle 66 extends between the underground pipe 32 and the metering pump 62 for delivering oxidation media to the water within the pipe 32. A measurement electrode 68 extends into the pipe 32 downstream from the injection nozzle 66 for monitoring oxidation of the water within the pipe 32. In addition to chemical oxidation, an air injector can be installed in the pipe 32 to assist in oxidizing the water, and thus the contaminants carried by the water.

Prior to treatment, groundwater 40 from the reservoir 36 can be sampled and analyzed for a variety of constituents including trace metals, non-metals and major ions. Particular attention can be focussed on the soluble levels of iron, sulfur and manganese, as well as the factors that affect their oxidation and removal from the groundwater, such as pH level, temperature, alkalinity, and the presence of catalysts. This information can then be used to establish the initial oxidant concentration and application rate for the groundwater. The set point of the chemical metering pump 62 can be determined from the desired water quality parameters. Oxidant can then be continuously metered into the groundwater through the nozzle 66 and monitored with the electrode 68. Preferably, the electrode 68 generates a millivolt (mV) signal from the reduction-oxidation (redox) process. The signal can then be compared to the set point of the metering pump and the set point can be automatically adjusted to provide an adjusted oxidant dosage. According to a preferred embodiment of the present invention, the oxidant is potassium permanganate ($KMnO_4$). The chemical reactions for iron and manganese oxidized with potassium permanganate are as follows:

$$3Fe^{2+}+KMnO_4+7H_2O \leftrightarrow 3Fe(OH)_3(s)+MnO_2+K^++5H^+$$

$$3Mn^{2+}+KMnO_4+2H_2O \leftrightarrow 5MnO_2(s)+2K^++4H^+$$

Following the oxidation stage, the groundwater is directed to the aeration tower 52 through the underground pipe 32. The underground pipe 32 helps to maintain the groundwater at an ideal temperature level, as will be described in greater detail below.

Figure 4:
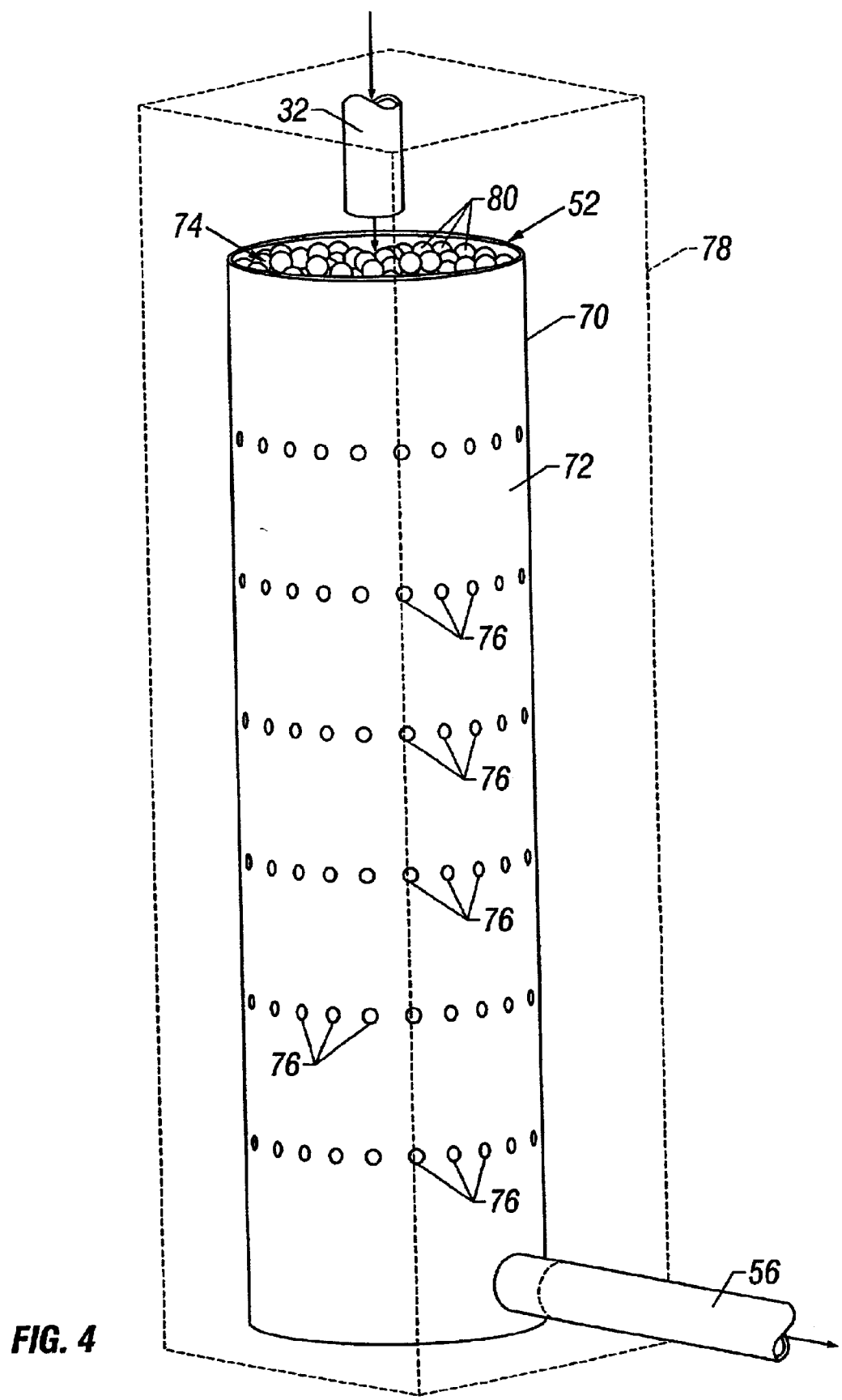
FIG. 4 is an enlarged perspective view of an aeration tower that forms part of the system of the present invention.

With additional reference to FIG. 4, the aeration tower 52 includes a generally cylindrical housing 70 that can be constructed of polyvinyl chloride (PVC) or other material well known to those of ordinary skill in the art. The housing 70 includes a continuous wall 72 that forms a hollow interior 74. Openings 76 are formed in the wall circumferentially around the housing 70 and extend between the hollow interior 74 and the outside of the housing. A catch basin 78 surrounds the housing 70 for catching groundwater that may flow through the openings 76. The height of the catch basin is approximately equal to the height of the housing 70, as shown in FIG. 4. Alternatively, the height of the catch basin can be much smaller, as shown in FIG. 2. An enclosure 79 (FIG. 2) constructed of fiberglass or other material, may surround the tower 52.

Bio-filtration media, shown here as a plurality of bio-media balls 80, are located in the hollow interior 74 of the housing 70, and preferably substantially fill the hollow interior.

Figure 5:
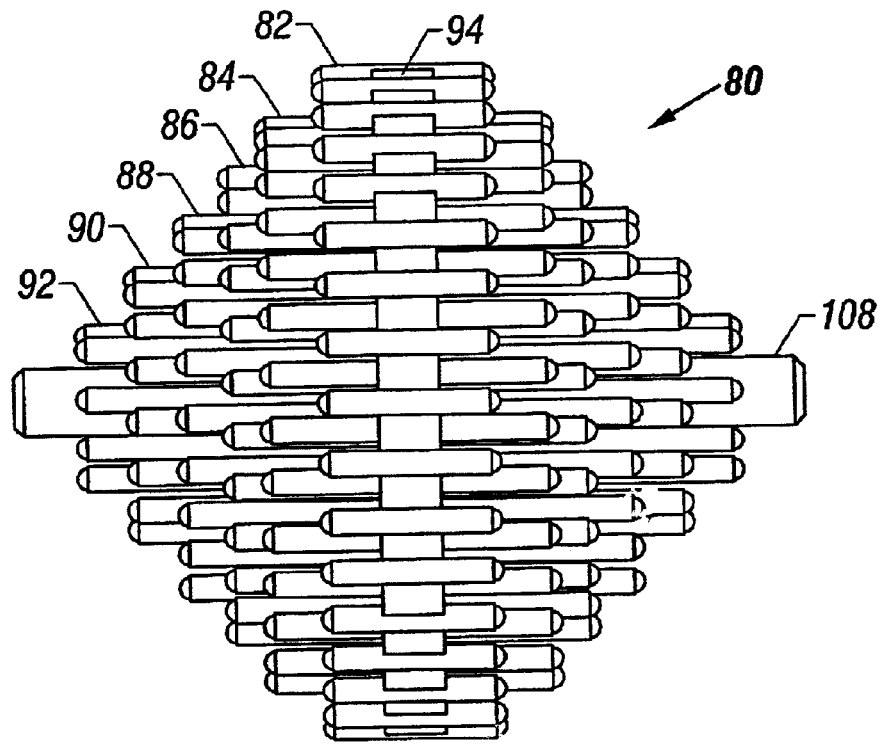
FIG. 5 is a top plan view of a filtration component that forms part of the system of the present invention.
Figure 6:
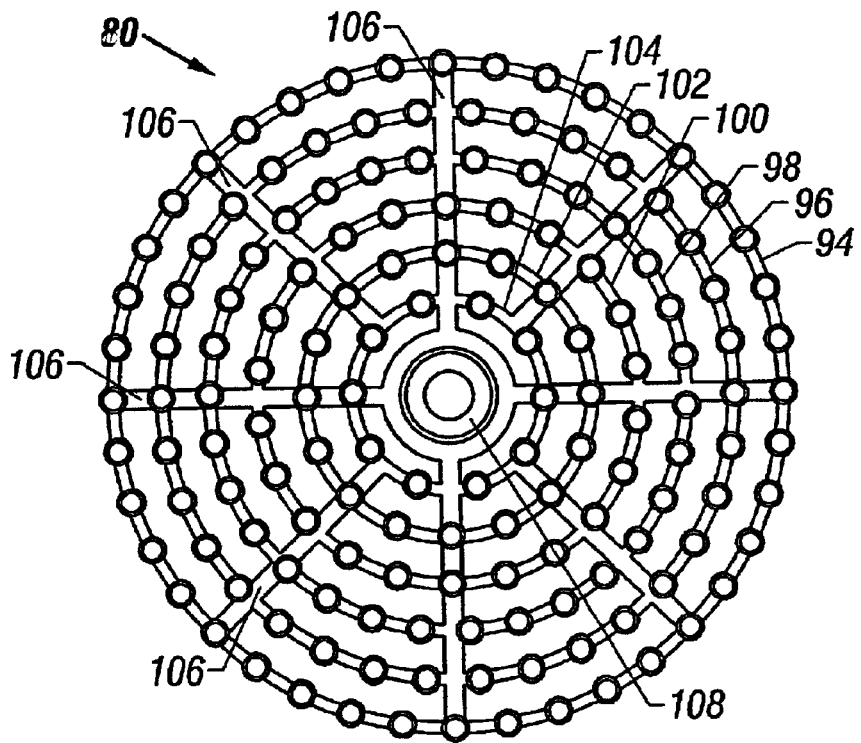
FIG. 6 is a side elevational view of the filtration component.

As shown in FIGS. 5 and 6, each of the bio-media balls 80 according to an exemplary embodiment of the invention is constructed of a plastic material and has a plurality of axially extending pins 82, 84, 86, 88, 90, and 92 arranged on concentric, annular rings or webs 94, 96, 98, 100, 102, and 104, respectively. Arms 106 extend radially from a centrally located rod 108 and are formed integral with the annular webs for holding the webs together. The pins are preferably integrally formed with their respective annular webs and progressively increase in length from the outer annular web 94 to the inner annular web 104. By way of example, the bio-media balls are about 1.5 inches in diameter and preferably include over one hundred pins. The pins provide both mechanical and biological filtration by physically blocking larger particles and by promoting the growth of bacteria over the relatively large surface area of the pins. The pins also help produce turbulence as the groundwater flows over the bio-media balls, aiding in the oxygenation process of the groundwater and the precipitation of contaminants on the surfaces of the pins. Although the bio-media balls have been shown as having a particular configuration, it will be understood by those of ordinary skill in the art that other bio-media configurations can be used. The bio-media balls are commonly used in freshwater and saltwater wet/dry systems and pond filters for breaking down toxic ammonia produced by aquatic life into less toxic nitrates and are commercially available from Lee's Aquarium & Pet Products (www.leesaqpet.com). Suitable bio-media balls and other bio-media configurations are commercially available from petsolutions® (www.petsolutions.com).

According to the invention, the bio-media balls are used for precipitating iron and sulfur on their surfaces, and are compatible with relatively high flow rates of the groundwater. Iron and sulfur bacteria are diverse in their taxonomy. Their primary usefulness and importance to the present invention is their ability to transform ferrous iron to ferric iron. These bacteria obtain energy by the oxidation of iron from the ferrous to the ferric state. Discharge from coal-bed methane wells is typically basic, although it may be acidic, and has carbonates, iron and sulfur forms. Ferric iron readily combines with the carbonates and sulfur to form precipitates which can be settled. The ferric form of iron is precipitated as ferric hydroxide. Water borne iron is available in many natural water systems, such as coal bed methane wells.

The bacterial oxidation of ferrous iron to the ferric form is generally as follows:

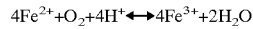

$$4Fe^{2+} + O_2 + 4H^+ \longleftrightarrow 4Fe^{3+} + 2H_2O$$

In the present invention, one or more bacteria of the chemoautotrophic type, including members of the bacteria genus *Thiobacillus ferrooxidans, Leptospirillum ferrooxidans, Sulfolobus acidocaldarius, Sulfobacillus thermosulfidooxidans*, and other bacteria exhibiting similar environmental, ecological, and/or metabolical properties, may be present in the groundwater from coalbed methane gas wells, drainage from mining operations, and other environments. Oxidation of ore and iron by a consortia of bacteria generally takes place at a higher rate than with pure cultures, and is ideally suited to the system and method of the present invention since more than one type of bacteria may be present in the groundwater. The consortia may include mixtures of bacterial genera, species and types that can react synergistically to produce impacts to the microenvironment. Thus, it is believed that no single genera or group of organisms is exclusively responsible for the process.

Groundwater from coalbed methane wells offer several key energy and nutritional circumstances that provide an acceptable and productive growth environment. Before the groundwater is oxygenated, the bacteria are in a substantially dormant state, and do not require nor consume iron and sulfur, and thus do not deposit the iron and sulfur byproducts of such consumption onto surfaces. Where oxidative and reductive environments change in the presence of iron and the large surface area of the bio-media balls, selected bacterial populations propagate. The relatively large surface area of the bio-media balls provide an excellent surface for the bacteria to adhere to and on which to deposit the contaminants, such as ferric hydroxide, sulfur, arsenic, and so on, from the water. Iron, sulfur and manganese may also precipitate independent of the bacteria and settle on the surfaces of the bio-media balls or at the bottom of the tower and tank. The propagation of the selected bacterial populations increases at a logarithmic rate, which in turn increases the metabolic requirements. The iron and sulfur present in the oxygenated ground water are therefore consumed at a higher rate, leading to increased filter efficiency.

Although the tower 52 is primarily used for aeration of the groundwater 40, the ferrous iron may be precipitated and deposited on the surfaces of the bio-media balls 80.

The tower 52, by way of example, may be constructed to continuously oxygenate ground water at a flow rate of approximately one hundred gallons per minute. For such a flow rate, the tower 52 can have an inside diameter of approximately 20 inches and a height of approximately 6.5 feet. The openings 76 are about one inch in diameter and are spaced on about two inch centers within the same row. The openings of adjacent rows can be spaced on one foot centers. It will be understood by those of ordinary skill in the art that these dimensions are given by way of example only, and can greatly vary depending on numerous factors, including the size and type of the bio-media, the water flow rate and the amount of oxygen and/or contaminants already present in the water.

Once the groundwater 40 exits the aeration tower 52, it is directed, preferably under pressure from the aeration tower 52 and gravity, to the filtration tank 54.

Figure 7:
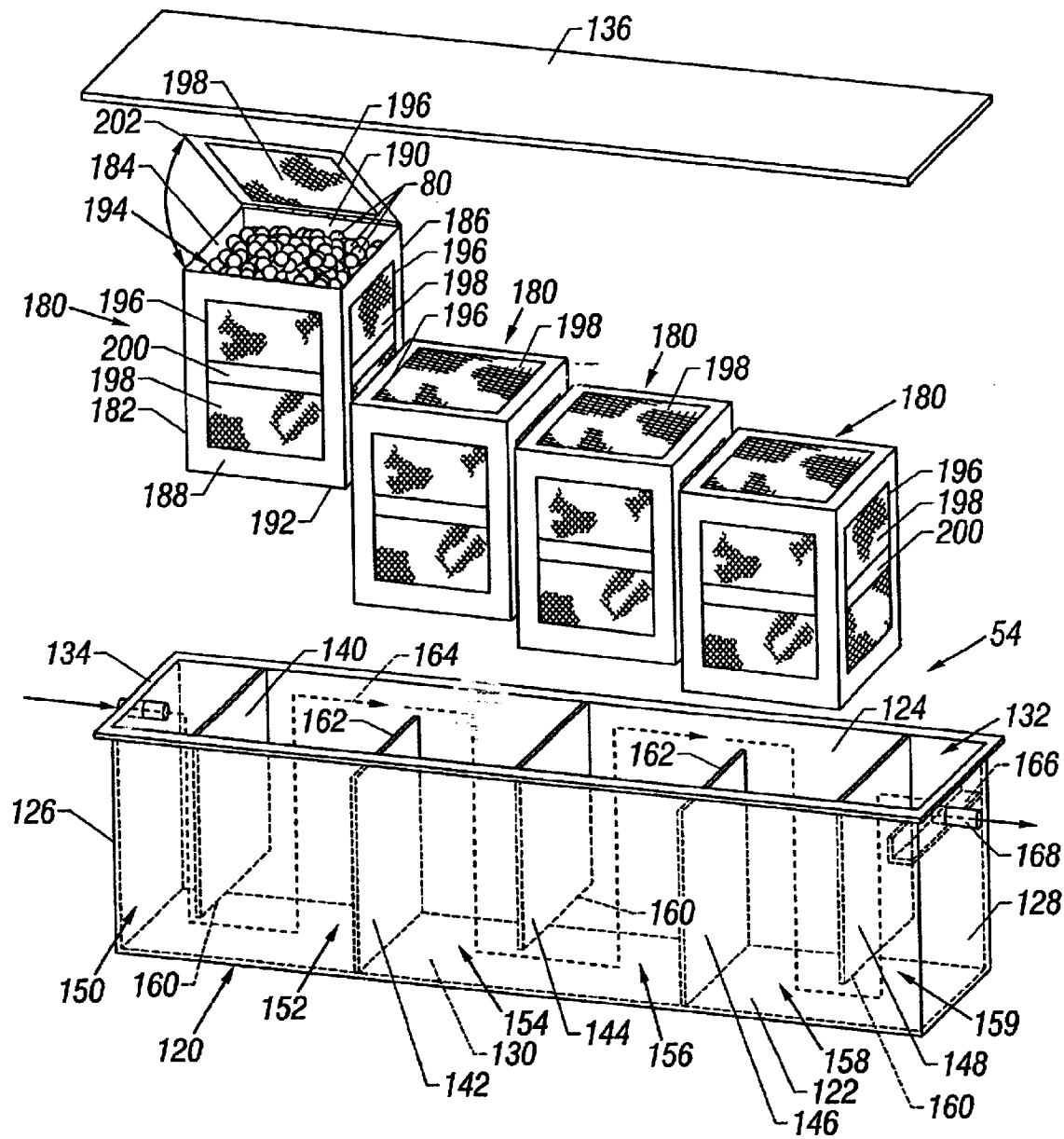
FIG. 7 is an exploded perspective view of a filtration tank that forms part of the system of the present invention.

Referring now to FIG. 7, the tank 54 has a tank housing 120 with elongate side walls 122 and 124 and end walls 126 and 128 connected at opposite ends of the side walls. A floor 130 extends between the side and end walls to form an hollow interior 132. A lip 134 extends around the upper periphery of the tank housing 120 for supporting a lid 136. The lid 136 encloses the hollow interior 132 and normally prevents the ingress of foreign matter into the tank housing 120 and the egress of water and contaminants from the tank housing.

Flow control weirs 140, 142, 144, 146, and 148 are positioned in the hollow interior 132 of the tank housing 120 and extend between the side walls 122 and 124 to divide the interior into an entrance chamber 150, filtration chambers 152, 154, 156, and 158, and an exit chamber 159. The weirs 140, 144 and 148 have a bottom edge 160 that is spaced from the floor 130 so that groundwater and contaminants can flow between the floor 130 and the weirs 140, 144 and 148. Likewise, the weirs 142 and 146 have an upper edge 162 spaced from the lid 136 when closed so that groundwater and contaminants can flow between the lid 136 and the weirs 142 and 146. In this manner, the groundwater must pass through the tank in a serpentine fashion from the entrance chamber 150 to the exit chamber 159, as represented by dashed line 164. The entrance chamber 150 and exit chamber 159 help to slow movement of the groundwater. An L-shaped flange extension 166 is attached to the end wall 128 below an exit pipe 168 to ensure that the filtered groundwater completely fills the exit pipe 168.

A filtration basket 180 is removably positioned in each of the filtration chambers 152, 154, 156, and 158. Each filtration basket 180 includes a housing 182 that is sized to be received in one of the filtration chambers. The housing 182 has end walls 184, 186 and side walls 188, 190 that extend between the end walls. A floor 192 extends between the side and end walls to form a hollow interior 194. Each wall has an opening 196 with a screen 198 located in the opening. A plate 200 extends generally horizontally across each opening to support the screen 198. Bio-media balls 80 are located in the hollow interior 194 of each basket 180 to deposit, precipitate and filter out contaminants from the ground water, as previously described with respect to the aeration tower 52. A lid 202 is hingedly connected to the housing 182 and includes an opening 196 with a screen 198 formed in the opening. The lid 202 holds the bio-media balls 80 in the basket during use and can be opened for emptying and filling the basket.

In use, the groundwater from the aeration tower 52 first enters the entrance chamber 150 to slow the water velocity prior to filtration. The water then flows upwardly through a first basket 180 in the first filtration chamber 152, followed by flowing downwardly through a second basket 180 in the second filtration chamber 154, flowing upwardly through a third basket 180 in the third filtration chamber 156, then flowing downwardly through a fourth basket 180 in the fourth filtration chamber 158, as shown by the dashed line 164. Finally, the water flows upwardly through the exit chamber and is discharged out of the tank to either the environment as surface drainage or to the second filtration stage 18 (FIG. 1). For a flow rate of one hundred gallons per minute, by way of example, the filtration tank 54 is preferably dimensioned to hold about 2,000 gallons of liquid, and each basket 180 is dimensioned to hold approximately 25,000 bio-media balls 80 of 1.5 inch diameter. With this example, the groundwater is in the filtration tank 54 for approximately twenty minutes, which in many cases gives enough time for the contaminants in the groundwater to be deposited as bacteria by-products onto the bio-media balls and other surfaces, and allows iron and sulfur precipitates, coal fines, sediment, and other relatively large particles in the groundwater to settle to the bottom of the baskets 180. In this manner, a substantial amount of contaminants are removed from the water.

As the bio-media balls become coated with metal oxides, the coatings serve as catalysts for oxidation and removal of additional precipitate from the groundwater. According to a preferred embodiment of the invention, the bio-media balls are pre-coated with metal oxides before being placed in the baskets 180 and inserted into the tank to expedite their effectiveness. When the surface area of the bio-media balls 80 is reduced to a predetermined value due to the build-up of metal oxides and other contaminants, the baskets can be removed and the bio-media balls replaced. The spent bio-media balls can then be cleaned and then recoated with metal oxide and stored for later use. Alternatively, a substantial portion of the spent bio-media balls can be cleaned, such as seventy-five percent, with the remaining portion being used as catalysts during the next filtration cycle. The bio-media balls can be cleaned by cracking the oxide layers through movement and/or vibration, and/or exposing them to surfactants. Larger particles that have collected in the bottom of the baskets, such as iron and sulfur precipitates, coal fines, debris, and the like, can also be removed from the baskets during removal of the spent bio-media balls.

Although four filtration chambers and baskets are shown, and a particular number of bio-media balls have been indicated for each basket, it is to be understood that these numbers can vary greatly, as well as the size of the filtration tank, baskets and chambers, depending on the amount of contaminants in the water, the water flow rate, the desired filtration time, and other factors.

Figure 3:
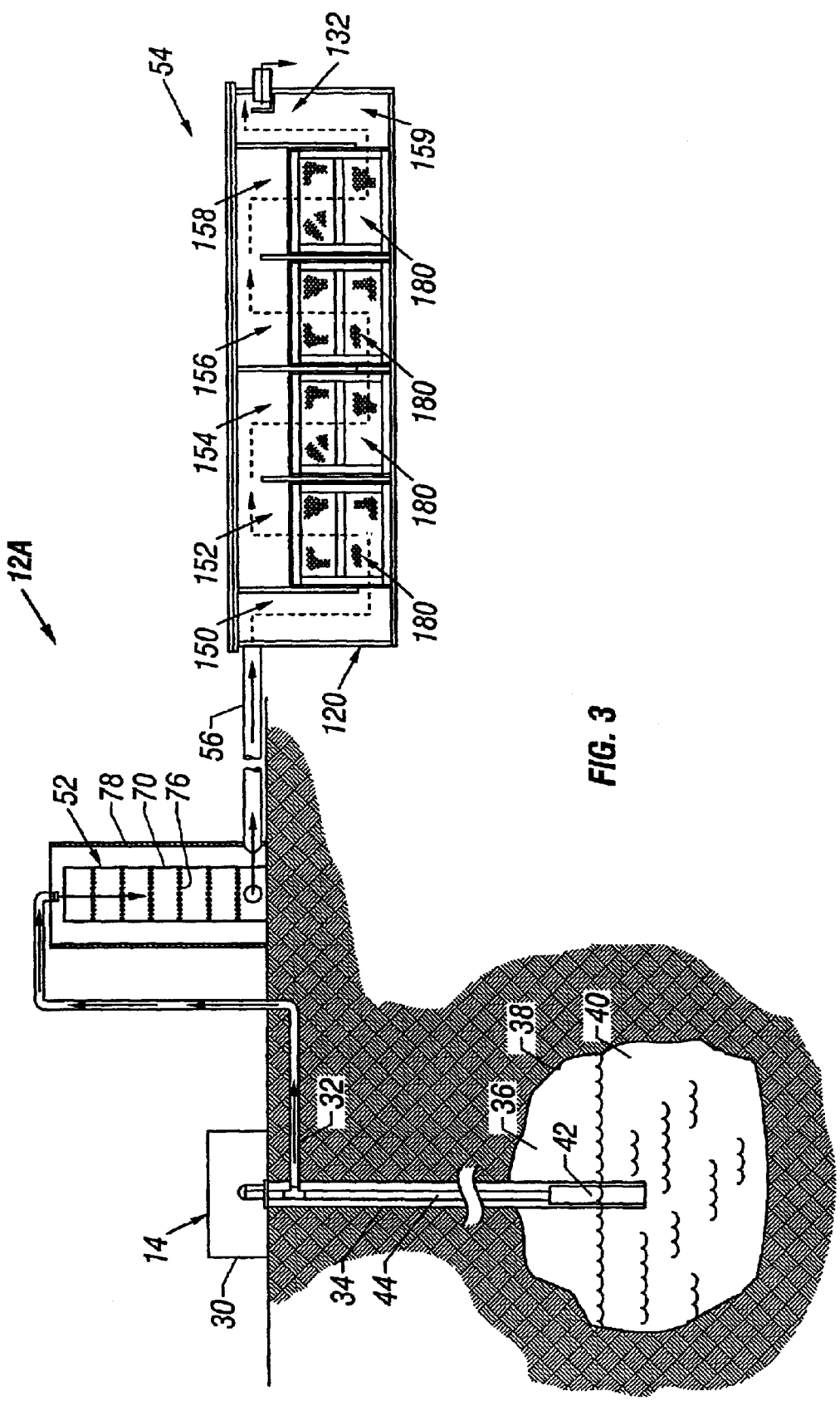
FIG. 3 is a schematic diagram of a system for removing contaminants from water according to a further embodiment of the present invention.

With reference now to FIG. 3, a first filtration stage 12A according to another preferred embodiment of the invention is shown, wherein like parts in the previous embodiment are represented by like numerals. The first filtration stage 12A is similar in construction to the first filtration stage 12 (FIG. 2), with the exception that the chemical treatment system 50 is removed. Surprisingly, it has been found that that the first filtration stage 12A is more efficient in removing contaminants from the groundwater than the first filtration stage 12. With the exemplary first filtration stage 12A as described, it has been found that approximately 80% iron and 66% manganese can be removed from the groundwater, with no visible staining when the groundwater is discharged into the environment. The first filtration stage 12A thus greatly improves the quality of the water before it is discharged into the environment or directed to the second filtration stage 18. By removing a substantial portion of the iron precipitates and other related contaminants at the first filtration stage 12A, the operating and maintenance costs for the second filtration stage can thus be greatly reduced.

It is to be understood that the various representative dimensions and capacities for the aeration tower, filtration tank, filtration baskets, and the bio-media balls as shown and described are given by way of example only. The representative dimensions and capacities illustrate only the relative proportions of the preferred embodiment of the system. It is to be understood that the overall dimensions, including the relative proportions and capacities, can be varied without departing from the spirit and scope of the present invention.

In each of the described embodiments, the groundwater can be inoculated with a particular type of bacteria or with a consortium of bacteria species, preferably before the groundwater enters the aeration tower. In this manner, bacteria beneficial to the filtration of a particular contaminant or group of contaminants, that otherwise may not be naturally present in the groundwater, can be used to remove the contaminants. The bacteria may be retrieved from other water sources or cultured in a laboratory or the like. The metering pump 62 (FIG. 2) can be used to infuse the bacteria into the groundwater.

It may also be desirable to remove the bacteria after the groundwater exits the filtration tank 54 and prior to entering the second filtration stage. The bacteria can be removed by infusing an oxidizer into the filtered groundwater, which burns the cell walls of the bacteria and destroys them.

Preferably, Ozone is injected into the filtered groundwater since it will naturally diffuse into the atmosphere downstream of the injection point. However, other oxidizers can be used, such as chlorine or potassium permanganate.

While the invention has been taught with specific reference to the above-described embodiments, those skilled in the art will recognize that changes can be made in form and detail without departing from the spirit and scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for removing contaminants from water with a relatively low oxygen content, the water having naturally occurring chemoautotrophic bacteria, and at least one of ferrous iron and sulfide, the method comprising:

oxygenating the water;

directing the oxygenated water to a filtration vessel, the filtration vessel having bio-filtration media with surfaces that are exposed to the oxygenated water;

propagating the chemoautotrophic bacteria in the presence of the oxygenated water and at least one of the ferrous iron and sulfide;

depositing at least one of ferric iron and iron sulfate on the bio-filtration media as a by-product of the chemoautotrophic bacteria;

precipitating at least one of ferric iron and iron sulfate in the presence of the oxygenated water;

removing the water from the filtration vessel; and wherein the chemoautotrophic bacteria include *Thiobacillus ferrooxidans*, the water is oxygenated by exposing the water to air and turbulence in an oxygenation vessel, the oxygenation vessel includes a housing with bio-filtration media to thereby create the turbulence in the water, and the bio-filtration media includes a plurality of bio-media balls, at least one having a plurality of axially extending pins positioned on concentric rings.

2. A method according to claim 1, wherein the chemoautotrophic bacteria include at least one of, *Leptospirillum ferrooxidans, Sulfolobus acidocaldarius*, and *Sulfobacillus thermosulfidooxidans*.

3. A method according to claim 1, and further comprising forming holes in the housing for exposing the water to air.

4. A method according to claim 1, wherein the removed water is further filtered at a secondary filtration stage.

5. A method according to claim 4, wherein the secondary filtration stage comprises at least one of reverse osmosis, ion exchange, activated charcoal, and capacitive deionization.

6. A method according to claim 1, and further comprising infusing bacteria into water before oxygenating the water.

7. A method for removing contaminants from water with a relatively low oxygen content, the water having naturally occurring chemoautotrophic bacteria, and at least one of ferrous iron and sulfide, the method comprising:

oxygenating the water;

directing the oxygenated water to a filtration vessel, the filtration vessel having bio-filtration media with surfaces that are exposed to the oxygenated water;

propagating the chemoautotrophic bacteria in the presence of the oxygenated water and at least one of the ferrous iron and sulfide;

depositing at least one of ferric iron and iron sulfate on the bio-filtration media as a by-product of the chemoautotrophic bacteria;

precipitating at least one of ferric iron and iron sulfate in the presence of the oxygenated water;

removing the water from the filtration vessel; and wherein the chemoautotrophic bacteria include *Thiobacillus ferrooxidans*, the water is oxygenated by exposing the water to air and turbulence in an oxygenation vessel, the oxygenation vessel includes a housing with bio-filtration media to thereby create the turbulence in the water, and forming holes in the housing for exposing the water to air.

8. A method according to 7, wherein the chemoautotrophic bacteria include at least one of, *Leptospirillum ferrooxidans, Sulfolobus acidocaldarius*, and *Sulfobacillus thermosulfidooxidans*.

9. A method according to claim 7, and further comprising a removable basket positioned in the at least one chamber and housing the bio-filtration media.

10. A method according to claim 7, wherein the removed water is further filtered at a secondary filtration stage.

11. A method according to claim 10, wherein the secondary filtration stage comprises at least one of reverse osmosis, ion exchange, activated charcoal, and capacitive deionization.

12. A method according to claim 7, and further comprising infusing bacteria into the water before oxygenating the water.

13. A method for removing contaminants from water with a relatively low oxygen content, the water having naturally occurring chemoautotrophic bacteria, and at least one of ferrous iron and sulfide, the method comprising:

oxygenating the water;

directing the oxygenated water to a filtration vessel, the filtration vessel having bio-filtration media with surfaces that are exposed to the oxygenated water;

propagating the chemoautotrophic bacteria in the presence of the oxygenated water and at least one of the ferrous iron and sulfide;

depositing at least one of ferric iron and iron sulfate on the bio-filtration media as a by-product of the chemoautotrophic bacteria;

precipitating at least one of ferric iron and iron sulfate in the presence of the oxygenated water;

removing the water from the filtration vessel; and wherein the water is oxygenated by exposing the water to air and turbulence in an oxygenation vessel, the oxygenation vessel includes a housing with bio-filtration media to thereby create the turbulence in the water, and the bio-filtration media includes a plurality of bio-media balls, at least one having a plurality of axially extending pins positioned on concentric rings.

14. A method according to claim 13, and further comprising forming holes in the housing for exposing the water to air.

15. A method according to claim 13, wherein the chemoautotrophic bacteria include at least one of *Thiobacillus ferrooxidans, Leptospirillum ferrooxidans, Sulfolobus acidocaldarius*, and *Sulfobacillus thermosulfidooxidans*.

16. A method according to claim 13, and further comprising forming holes in the housing for exposing the water to air.

17. A method according to claim 13, and further comprising a removable basket positioned in the at least one chamber and housing the bio-filtration media.

18. A method according to claim 13, wherein the removed water is further filtered at a secondary filtration stage.

19. A method according to claim 18, wherein the secondary filtration stage comprises at least one of reverse osmosis, ion exchange, activated charcoal, and capacitive deionization.

20. A method according to claim 13, and further comprising infusing bacteria into the water before oxygenating the water.

21. A method for removing contaminants from water with a relatively low oxygen content, the water having naturally occurring chemoautotrophic bacteria, and at least one of ferrous iron and sulfide, the method comprising:

oxygenating the water;
 directing the oxygenated water to a filtration vessel, the filtration vessel having bio-filtration media with surfaces that are exposed to the oxygenated water;
 propagating the chemoautotrophic bacteria in the presence of the oxygenated water and at least one of the ferrous iron and sulfide;
 depositing at least one of ferric iron and iron sulfate on the bio-filtration media as a by-product of the chemoautotrophic bacteria;
 precipitating at least one of ferric iron and iron sulfate in the presence of the oxygenated water;
 removing the water from the filtration vessel; and
 wherein the filtration vessel comprises at least one weir dividing the filtration vessel into a plurality of chambers, with the bio-filtration media located in at least one of the chambers.

22. A method according to claim 21, and further comprising a removable basket positioned in the at least one chamber and housing the bio-filtration media.

23. A method according to claim 21, wherein the chemoautotrophic bacteria include at least one of *Thiobacillus ferrooxidans, Leptospirillum ferrooxidans, Sulfolobus acidocaldarius*, and *Sulfobacillus thermosulfidooxidans*.

24. A method according to claim 21, and further comprising forming holes in the housing for exposing the water to air.

25. A method according to claim 21, wherein the removed water is further filtered at a secondary filtration stage.

26. A method according to claim 25, wherein the secondary filtration stage comprises at least one of reverse osmosis, ion exchange, activated charcoal, and capacitive deionization.

27. A method according to claim 21, and further comprising infusing bacteria into the water before oxygenating the water.

28. A method for removing contaminants from water with a relatively low oxygen content, the water having naturally occurring chemoautotrophic bacteria, and at least one of ferrous iron and sulfide, the method comprising:

oxygenating the water;
 directing the oxygenated water to a filtration vessel, the filtration vessel having bio-filtration media with surfaces that are exposed to the oxygenated water;
 propagating the chemoautotrophic bacteria in the presence of the oxygenated water and at least one of the ferrous iron and sulfide;
 depositing at least one of ferric iron and iron sulfate on the bio-filtration media as a by-product of the chemoautotrophic bacteria;
 precipitating at least one of ferric iron and iron sulfate in the presence of the oxygenated water;
 removing the water from the filtration vessel; and
 infusing bacteria into the water before oxygenating the water; and
 injecting an oxidant into the water to thereby kill the bacteria after the removing the water from die filtration vessel.

29. A method according to claim 28, wherein the chemoautotrophic bacteria include at least one of *Thiobacillus ferrooxidans, Leptospirillum ferrooxidans, Sulfolobus acidocaldarius*, and *Sulfobacillus thermosulfidooxidans*.

30. A method according to claim 28, and further comprising forming holes in the housing for exposing the water to air.

31. A method according to claim 28, and further comprising a removable basket positioned in the at least one chamber and housing the bio-filtration media.

32. A method according to claim 28, wherein the removed water is further filtered at a secondary filtration stage.

33. A method according to claim 32, wherein the secondary filtration stage comprises at least one of reverse osmosis, ion exchange, activated charcoal, and capacitive deionization.

34. A method for removing contaminants from water with a relatively low oxygen content, the water having naturally occurring chemoautotrophic bacteria, and at least one of ferrous iron and sulfide, the method comprising:

oxygenating the water;
 directing the oxygenated water to a filtration vessel, the filtration vessel having bio-filtration media with surfaces that are exposed to the oxygenated water;
 propagating the chemoautotrophic bacteria in the presence of the oxygenated water and at least one of the ferrous iron and sulfide;
 depositing at least one of ferric iron and iron sulfate on the bio-filtration media as a by-product of the chemoautotrophic bacteria;
 precipitating at least one of ferric iron and iron sulfate in the presence of the oxygenated water;
 removing the water from the filtration vessel; and
 injecting an oxidant into the water to thereby kill the bacteria after the removing the water from the filtration vessel.

35. A method according to claim 34, wherein the chemoautotrophic bacteria include at least one of *Thiobacillus ferrooxidans, Leptospirillum ferrooxidans, Sulfolobus acidocaldarius*, and *Sulfobacillus thermosulfidooxidans*.

36. A method according to claim 34, and further comprising forming holes in the housing for exposing the water to air.

37. A method according to claim 34, and further comprising a removable basket positioned in the at least one chamber and housing the bio-filtration media.

38. A method according to claim 34, wherein the removed water is further filtered at a secondary filtration stage.

39. A method according to claim 38, wherein the secondary filtration stage comprises at least one of reverse osmosis, ion exchange, activated charcoal, and capacitive deionization.

40. A method according to claim 34, and further comprising infusing bacteria into the water before oxygenating the water.

* * * * *